United States Patent Office 3,446,062
Patented May 27, 1969

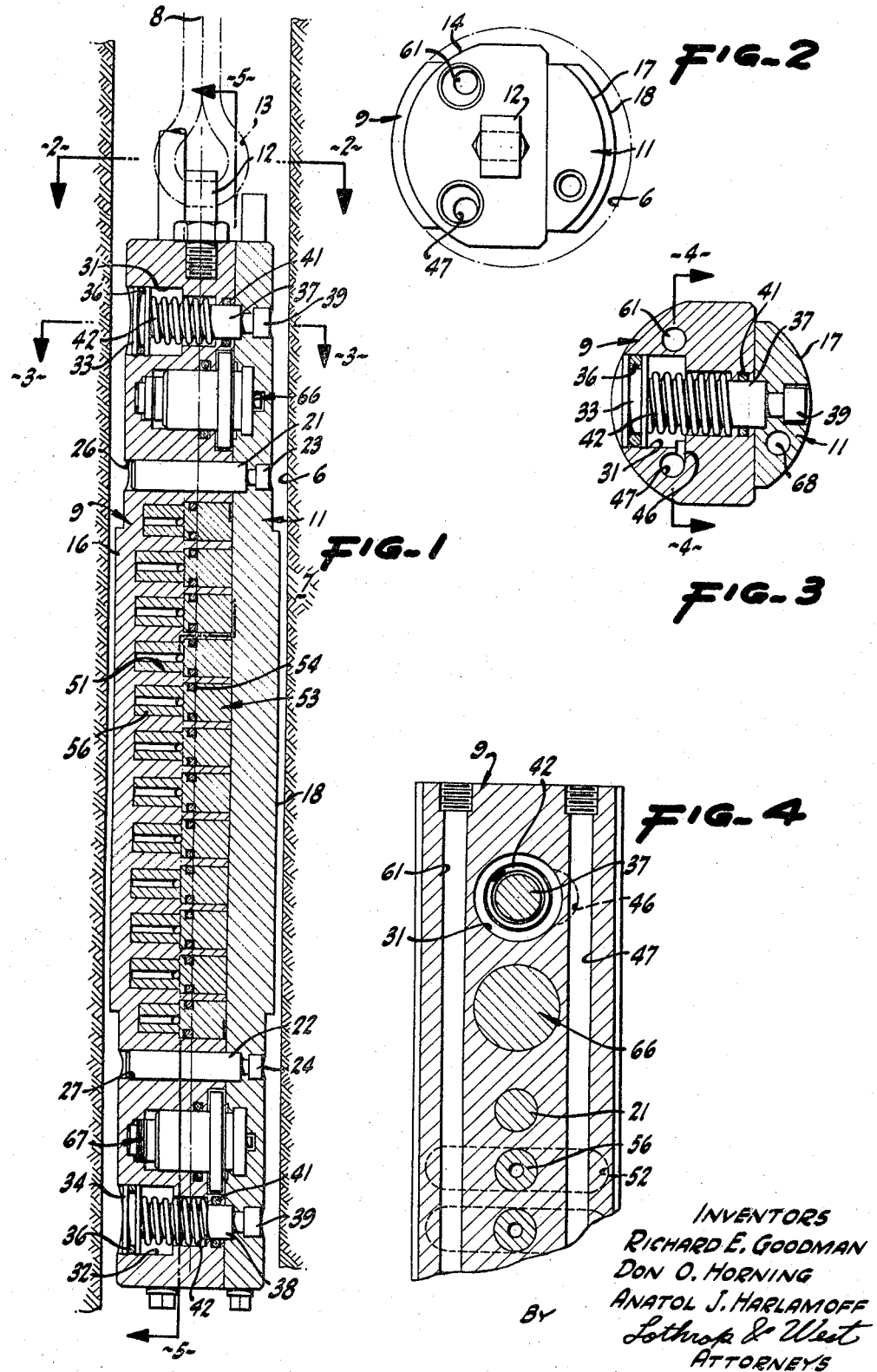

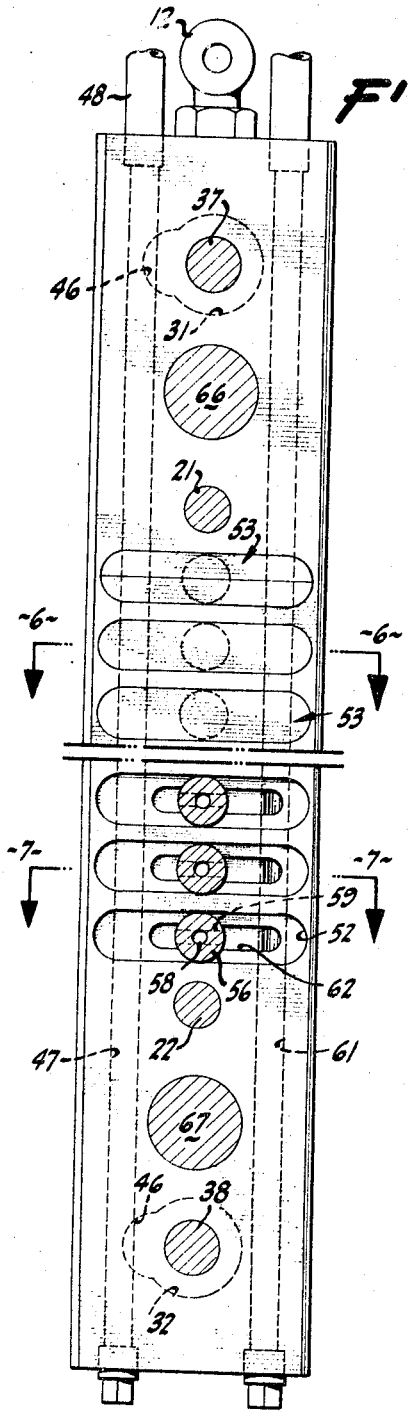
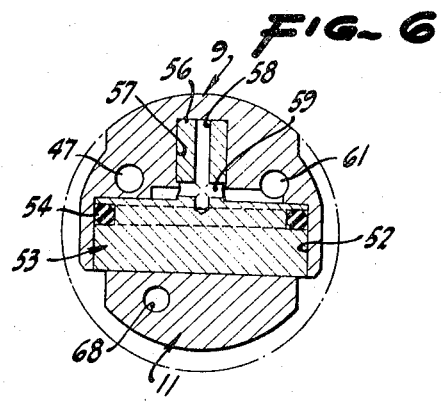

3,446,062
DEVICE FOR TESTING ROCK IN PLACE
Richard E. Goodman, Albany, Don O. Horning, Berkeley, and Anatol J. Harlamoff, Kensington, Calif., assignors to The Regents of the University of California, Berkeley, Calif.
Filed Aug. 22, 1966, Ser. No. 573,920
Int. Cl. G01n 3/00
U.S. Cl. 73—84                                    3 Claims

ABSTRACT OF THE DISCLOSURE

A device for testing rock in place has bearing shoes moved apart by a plurality of elliptical, hydraulically expansible chambers arranged with their short dimensions close together, the expanding distance between the shoes being automatically measured.

---

Our invention relates to mechanisms especially designed to be placed in a hole bored in rock in its natural situation and operable to exert pressure upon the rock and to respond to displacement of the rock in order to determine the characteristics thereof. While rock is referred to specifically, the device is also effective in soil, concrete or other comparable material, and the term "rock" as used herein includes all materials with which the device can be used. Devices of this sort are useful in situ for academic investigative purposes, and are particularly useful in determining qualities or characteristics of rock important in civil engineering. There are several practical requirements. The device should be of a compass and size to be handled in the field and readily used with the standard or common size of bore hole normally available. The device should be effective in underwater operation since often rock to be tested in position is located beneath water. The device should be effective to exert pressures of the order of ten thousand pounds per square inch without deleterious effect upon the device. The mechanism should also be able to operate at virtually any depth under water or beneath the earth's surface. The range of motion of the device can be varied to suit the intended use. For rock, the range need not be great since most rock is displaceable only with great difficulty. A movement of the order of two-tenths or a quarter of an inch is adequate for most rock. The device must be sensitive enough to measure rock displacements of the order of one ten-thousandth of an inch.

It is therefore an object of our invention to provide a device for testing rock in place which will meet all of the foregoing requirements.

Another object of the invention is to provide such a device which is relatively simple and inexpensive in its construction and which requires only ordinary or well-recognized techniques for its operation.

Another object of the invention is to provide a device of the character described which will serve over a long period of time in different environments to afford closely reproduceable results.

An additional object is to provide a device that will use the force available with high efficiency.

A further object of the invention is in general to provide an improved device for testing rock in place.

Other objects together with the foregoing are attained in the embodiment of the invention described in the accompanying description and illustrated in the accompanying drawings, in which:

FIGURE 1 is a cross section on an axial plane showing a bore hole of ordinary characteristics within which the testing device is disposed, the device being illustrated in cross section on an axial plane;

FIGURE 2 is a cross section, the plane of which is indicated by the line 2—2 of FIGURE 1;

FIGURE 3 is a cross section, the plane of which is indicated by the line 3—3 of FIGURE 1;

FIGURE 4 is a cross section, the plane of which is indicated by the lines 4—4 of FIGURE 3;

FIGURE 5 is a cross section, the planes of which are indicated by the lines 5—5 of FIGURE 1;

FIGURE 6 is a cross section, the plane of which is indicated by the line 6—6 of FIGURE 5; and FIGURE 7 is a cross section, the plane of which is indicated by the line 7—7 of FIGURE 5.

The testing device can be incorporated in a number of different fashions, but has been built successfully as shown in the accompanying drawings. The device is primarily for use in a bore hole 6 previously prepared in a rock surrounding 7. The bore hole customarily is circular cylindrical about a central axis 8 and is of a relatively standard diameter; for example, of the order of three inches.

The device itself includes a pair of bearing shoes 9 and 11 which are arranged symmetrically with respect to the axis 8 but which are of different configurations. The larger bearing shoe 9 is at its upper end provided with a connection 12 to any suitable sort of supporting or guiding device 13, in this instance illustrated as a cable or wire rope. This extends to the outer end of the bore 6 to an operating station. At the same operating station, the various auxiliary equipments are arranged.

The bearing shoe 9 in transverse cross section is partially defined by a circular cylindrical surface 14 of somewhat lesser radius than that of the bore hole 6 and is additionally defined by a contact pad 16 of larger radius than the surface 14 and a close approximation to the radius of the bore hole 6. The contact pad not only has a limited circumferential extent, equal approximately to a quarter of the periphery of the bore hole 6, but likewise has a carefully limited axial extent so that the total area of the contact pad 16 is closely determined.

The other bearing shoe 11 is of less massive construction than the shoe 9. It is partially defined by an outer circular cylindrical surface 17 provided with a contact pad 18 substantially duplicating the pad 16 both in radius, arcuate extent and axial extent. By this means there are provided two diametrically opposite pads 16 and 18 which are virtual counterparts of each other.

Means are provided for relating the bearing shoes to each other for restricted motion.

The bearing shoe 11, being elongated, is provided with duplicate structures, one adjacent one end and one adjacent the other. Thus, there are provided a pair of dowel pins 21 and 22 of circular cylindrical configuration anchored in recesses in the shoe 11 by fastening screws 23 and 24 respectively. The dowel pins 21 and 22 are transversely slidable within bores 26 and 27 within the shoe 9, so that the shoes are constrained against any motion relative to each other except rectilinear translation in a direction transversely of or normal to the axis 8.

Means are provided for normally and lightly urging the two shoes toward each other so that their compass is somewhat less than that of the bore hole and also for strongly forcing the shoes 9 and 11 toward each other. Again, since the device is relatively elongated, there are provided duplicate expansible chamber devices near the opposite ends thereof. For that reason, the shoe 9 adjacent its upper and lower ends, as seen in FIGURE 1, is provided with a pair of partial cross bores 31 and 32 in which pistons 33 and 34 are reciprocable, the pistons being provided with sealing means 36. The pistons are connected to stationary piston rods 37 and 38 anchored in counterbores in the shoe 11 by means of fastening screws 39. Surrounding the rods 37 and 38 are sealing devices 41 and springs 42 butting against the pistons 33 and 34 at one end and against the bottom of a counter bore in the shoe 9 at the other end. The effect of the springs is to exert a light force urging the shoes to slide together along the dowel pins 21 and 22, so that for ordinary packing, handling and quiescent storage the parts of the device are closely approached.

In addition to the spring means for urging the parts together, there is also provided a means for forcing the shoes together. For that reason, particularly as shown in FIGURES 2 and 3, the cylinders 31 and 32 are both provided with cross passages 46 (FIGURE 3) interconnecting the cylinders beneath the pistons with a longitudinal fluid channel 47. This is plugged at its lower end and has an appropriate connection 48 at its upper end to a controlled source of pressure fluid. Under pressure of the fluid the pistons are forceably driven toward the left as seen in FIGURE 1. The fluid pressure thereunder can be relieved by reversing the fluid valving, not shown, but standard.

Since the main function of the device is to exert outward pressure, the shoes 9 and 11 are related to additional expansion chambers effective to force the shoes apart. This is arranged by providing the shoe 9 with a number of similar expansion chambers, for example, 51. These are all substantially alike so that a description of one applies equally to the others. Formed in the shoe 9 is a cylinder 52 (FIGURES 6 and 7). This cylinder has truly cylindrical walls extending parallel to each other and generally in a direction normal to the axis 8, although the walls do not define a circular cylinder. Rather, the cylinder is one defined by half circles at the opposite ends and by straight intervening connecting walls. While this shape, sometimes called "obround," is not truly a mathematical ellipse, it is referred to herein as an elliptical shape. The cylinder 52 is partially occupied by a correspondingly contoured piston 53 grooved to carry an O-ring 54 or comparable sealing device so that there is no leakage past the piston walls. Also, the piston 53 carries a central plunger 56 of circular cylindrical configuration and fits within a small cylinder 57 within the shoe 9. So that there is communication with the cylinder 57, the plunger 56 is provided with a central bore 58 opening at one end to the cylinder 57 and at the other end communicating with a cross bore 59 opening into the cylinder 52. The cylinders 52 and 57 are always in free intercommunication.

To exert a radially outward force on the shoe 11, which is in physical contact with the face of the elliptical piston 53, there is provided a fluid conduit 61 extending axially through the shoe 9, being sealed at one end and at the other end connecting to a suitable controlled source of hydraulic fluid under pressure. The conduit 61 is connected to the cylinder 52 directly by means of an elongated slot 62 intersecting the conduit 61 and also intersecting the cylinder 52.

With this arrangement, when pressure fluid is supplied through the conduit 61, it flows into the slots 62 and into all of the cylinders 52 and then through the passages such as 58 and 59 into the cylinders 57. There is thus exerted a radially outward force tending to urge the shoe 11 apart from the shoe 9 in a direction normal to the axis 8. This pressure can be varied and maintained substantially uniformly all along the length of the shoes and particularly immediately opposite the contact pads 16 and 18 thereon. The arrangement uses the pressure quite efficiently since a large part of the available area is given over to piston area.

When the shoes 9 and 11 are to be translated toward each other, the hydraulic pressure in the conduit 61 is relieved and a restoring force is exerted by the springs 42. This, however, is a relatively small force, and to accelerate the return motion, pressure fluid is then supplied through the correspondingly connected duct 47. This communicates through the channels 46 with the interior of the two cylinders 31 and 32, so that force is exerted to draw the shoes 9 and 11 together, thus augmenting the spring force.

The motion of the two shoes is controlled from a remote point by the control of the fluid under pressure. The contact pads 16 and 18 after initially coming into contact with the walls of the rock bore do not then move appreciably except with substantial increase in fluid pressure. This pressure can be observed by any normal means at the control point. To relate to such pressure there is also provided means for indicating the position of the shoes 9 and 11 with respect to each other. For this reason the shoes 9 and 11 are properly contoured to provide receptacles for a pair of linear variable differential transformers 66 and 67 spaced apart from each other and lying at opposite ends of the series or array of expansible chambers 51. These devices are of a standard sort and indicate the relative position of the two shoes with a high degree of accuracy. They are electrical devices and their leads are connected to them through a bore 68 in the shoe 11.

The operation of this device can ensue as soon as the device has been properly positioned in the bore 6 and has been supplied with fluid under pressure. The indications of the differential transformers 66 and 67 are made apparent at the control point, and the variation in pressure with the variation in position or vice versa are noted. By observing these values it is possible to determine many of the important characteristics of the wall rock making up the boundaries of the bore 6.

It is also possible, since the contact pads 16 and 18 are somewhat limited in arcuate extent, and by properly rotating and controlling the positioning device 13, to orient the testing device about the axis 8 into a selected polar position. Readings taken thereafter indicate the particular characteristic of the rock as considered in that particular direction.

By the use of this mechanism, therefore, which is readily portable and can be utilized in the normally provided bores 6, it is possible to exceed considerably the preferred design pressure of ten thousand pounds per square inch and to test rock in position for its engineering capacities. The process is a continuous one, although it can be made intermittent for different polar orientations of the device. The various requirements set forth hereinabove have all been accomplished practically in the form of device shown herein.

What is claimed is:

1. A device for testing rock in place comprising a pair of axially elongated diametrically opposed bearing shoes having opposed cylindrical bearing surfaces of substantially equal dimensions and area; cooperating relatively slidable means on said shoes guiding them for diametrical linear movement relative to each other; cylinder chambers in one shoe; pistons in said cylinder chambers and bearing against the other shoe; a fluid passageway extending within said one shoe and communicating with all said cylinder chambers for supplying fluid under pressure to said chambers; and means between said shoes for measuring relative diametrical movement therebetween.

2. A device as defined in claim 1 wherein said cooperating means comprise diametrically extending rods fixed to one shoe and slidable in bores in the other shoe.

3. A device as defined in claim 1 wherein said bearing surfaces are defined by outwardly extending pad portions on said shoes, each extending circumferentially substantially ninety degrees.

References Cited

UNITED STATES PATENTS 3,175,392  3/1965  Tharalson et al. _____ 73—84
1,141,077  5/1915  Sickman _____ 92—177 X
2,409,555  10/1946 Gadoux et al. _____ 92—177 X

FOREIGN PATENTS 540,806  12/1931  Germany.
568,912  1/1933  Germany.
588,679  12/1959  Canada.

CHARLES A. RUEHL, *Primary Examiner.*

U.S. Cl. X.R.

73—94